Aug. 19, 1958 F. R. MALLALIEU 2,848,551

DIRECT CALL SECRECY INTERCOMMUNICATING TELEPHONE EQUIPMENT

Filed May 31, 1955 4 Sheets-Sheet 1

INVENTOR
Frank R. Mallalieu
BY
ATTORNEYS.

INVENTOR
Frank R. Mallalieu
BY
ATTORNEYS.

DIRECT CALL SECRECY INTERCOMMUNICATING TELEPHONE EQUIPMENT

Filed May 31, 1955 4 Sheets-Sheet 3

INVENTOR
Frank R. Mallalieu
BY
ATTORNEYS

Aug. 19, 1958 F. R. MALLALIEU 2,848,551

DIRECT CALL SECRECY INTERCOMMUNICATING TELEPHONE EQUIPMENT

Filed May 31, 1955 4 Sheets-Sheet 4

INVENTOR
Frank R. Mallalieu
BY
ATTORNEYS.

2,848,551
Patented Aug. 19, 1958

2,848,551

DIRECT CALL SECRECY INTERCOMMUNICATING TELEPHONE EQUIPMENT

Frank R. Mallalieu, Oxford, Pa.

Application May 31, 1955, Serial No. 512,139
7 Claims. (Cl. 179—38)

Figure 1:
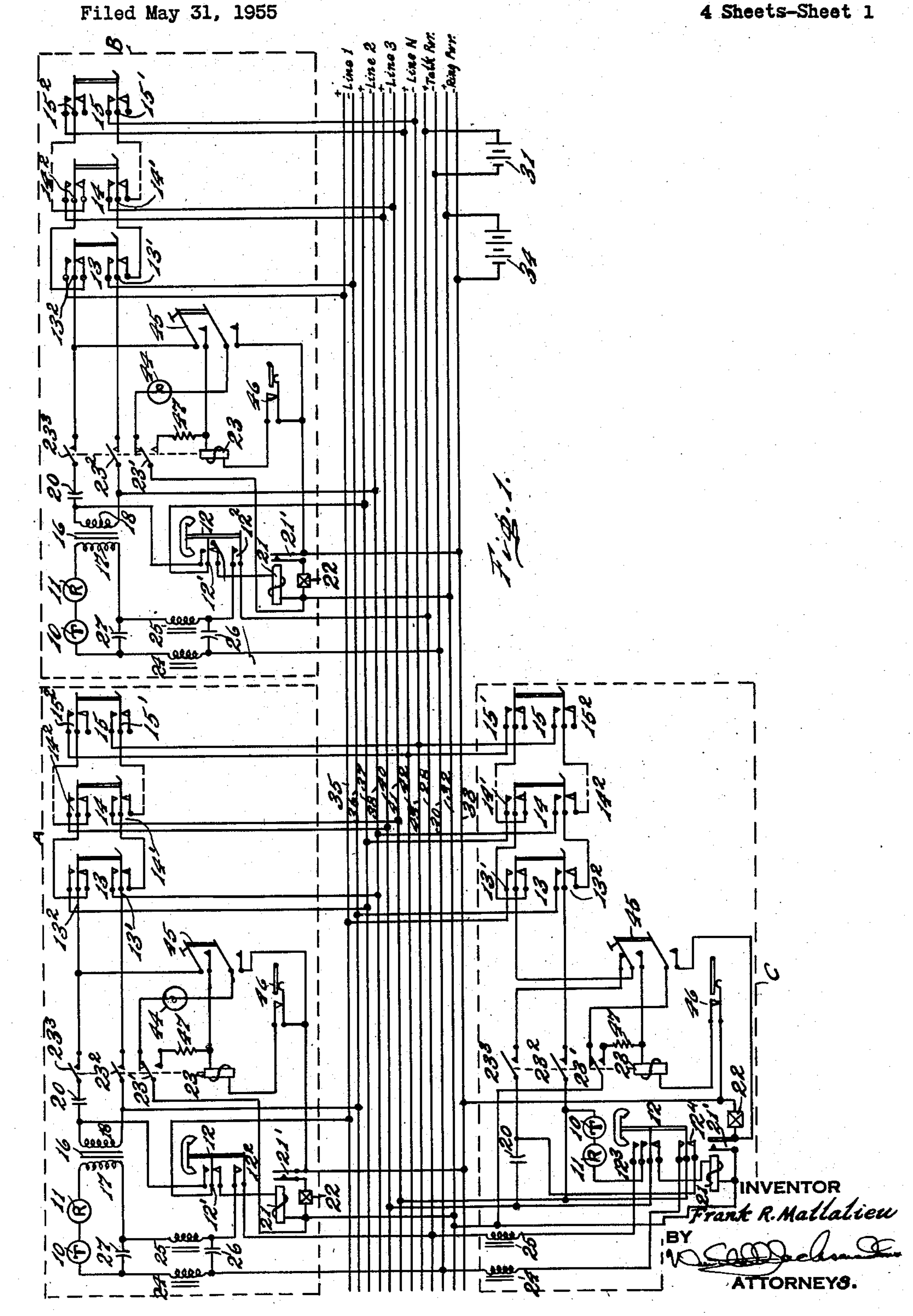

The present invention relates to intercommunicating telephone equipment of the direct call secrecy type.

A purpose of the invention is to avoid operational failures in a direct call secrecy telephone equipment when two power sources become accidentally connected together.

A further purpose is to provide preferably only one direct current power source, instead of two such power sources, to operate an intercommunicating telephone equipment of the direct call secrecy type.

A further purpose is to avoid polarization of the outgoing line so that the operation of the telephone equipment will not be interfered with by accidental reversal of connections on an outgoing line pair.

A further purpose is to separate the local voice circuit from the outgoing line as far as direct current is concerned, while coupling the circuits for alternating current (the voice current), by interposing a transformer having different windings in the different circuits.

A further purpose is to provide one of the transformer windings in the local talking circuit, another of the transformer windings across the outgoing line and a third transformer winding across the incoming line.

A further purpose is to connect one winding permanently to the incoming line with the signal receiving relay connected at some point to this winding, desirably at the middle thereof, and the contacts on the hook switch provided to break the circuit comprising the coil of the signal receiving relay when the hand set is lifted, so that the need for maintaining a special polarity in the incoming line pairs is eliminated.

A further purpose is to interpose a transformer in a direct call secrecy intercommunicating telephone equipment with only one side of the outgoing line circuit connected to a contact on the privacy relay.

A further purpose is to arrange the hand set and feeding elements in combination with the transformer without need for a condenser.

A further purpose is to arrange the hand set and feeding elements in combination with the transformer so that only one condenser is required.

A further purpose is to use only one power source for both signalling and talking.

Further purposes appear in the specification and in the claims.

In the drawings I have chosen to illustrate one only of the numerous embodiments in which my invention may appear, selecting the forms shown from the standpoints of convenience in illustration, satisfactory operation and clear demonstration of the principles involved.

The drawings are electrical circuit diagrams.

Direct call secrecy intercommunicating telephone equipment has been extensively used since the disclosure of Andrick U. S. Patent 1,180,559, for Secrecy Intercommunicating Telephone System. This circuit has given good service under many operating conditions, but serious difficulties have arisen in certain cases. One source of trouble has been accidental short circuiting between the two power sources necessary in such prior art systems. The present invention has avoided this difficulty and in fact makes it possible in new installations to use a single power source, insuring a definite saving in first cost and elimination of this possible source of difficulty. The invention also contemplates a novel manner of feeding talking power to the hand set with elimination of some or all of the condensers which have previously been necessary, while maintaining a high quality of performance and avoidance of cross talk.

The invention furthermore eliminates the danger of trouble through failure to maintain polarity in the incoming line, since in the preferred embodiment the device will operate successfully without regard to the polarity of the wires in an incoming line pair.

It will be evident throughout the disclosure that the principles of the invention are applicable to advantage either to a single station of a system, or to a complete system, and that the system employing the principles of the present invention may include stations of prior art type or may consist entirely of stations operating according to the principles of the present invention.

In accordance with the invention, the application of talking power potentials is limited to the local elements of the telephone circuit comprising the hand set, and such potentials are not applied to the outgoing line wires. Furthermore, the invention contemplates the application of signalling (ringing) potentials to outgoing line wires and signalling elements of the circuit only. This distinction was not maintained in the prior art, since in the prior art talking potentials and signalling potentials were each applied to the line wires at various times in the cycle of operation. This gave rise to the possibility that the two sources might become connected together, either by short circuits or by leakage from certain of the line wires, or through the telephone circuit elements themselves under certain operating conditions. This result was very serious, since the busy test upon which the privacy of the conversation depended was based upon the recognition of the presence of one or the other of the separate potentials on the called line. Any confusion in the two potentials would result in partial or complete failure of privacy. Furthermore, talking elements of various stations could under some conditions be linked through signalling elements, giving rise to cross talk.

The transformer elements used in the present invention confine the separate potentials to their proper portions of the system and as a further advantage, make possible the use of a single power source, resulting in a saving of cost.

The drawings, according to usual practice, show all switches in the normal or off position, all relays deenergized, and hook switches in the position with the hand set in the cradle.

Figure 1 is a schematic diagram illustrating one embodiment of the invention and also a part of the intercommunication multiple and two connected sets, one of which is wired in accordance with the prior art.

Sets A and B are wired according to the present invention and set C is a prior art set, but the three sets are connected together operatively in accordance with the invention. Thus one or more stations according to the present invention can be added to an existing system having prior art stations.

Each of the intercommunicating sets A and B has the usual transmitter 10 and receiver 11 combined into a hand set, a switch 12, commonly called the hook switch, which is actuated by the weight of the receiver or hand set when it is in place, and calling switches 13, 14 and 15 provided in actual sets in various quantities depending upon the size or calling capacity of the set. Each of the sets according to the present invention also has a transformer 16 having windings 17 and 18 which constitutes the principal novel element in accordance with the present invention, a condenser 20 for breaking the path for direct currents between the home line and the calling switch multiple, a relay 21 and a signal device such as a buzzer 22.

The relay 21 is shown as the preferred embodiment although it will be understood that a suitably selected buzzer can be operated directly in the line in place of the relay, or additional switching contacts can be provided on hook switch 12 and thereby relay 23, to be described, could be made to perform the function of relay 21 when the hand set is hung up and to perform the principal function when the hand set is lifted. Such variations are well known to those skilled in the art and are regarded as unimportant in the present invention, and accordingly the preferred form only is illustrated.

A privacy relay 23 is also employed along with choke coils 24 and 25. The choke coils provide for feeding the required direct current to the talking circuit and are sometimes called retardation coils, impedance coils and feeding coils. As well known in the art these coils may have separate cores as shown or they may have a common core. Equivalent means may be used, such as resistors. The choke coils cooperate with condensers 26 and 27 to form a low pass filter which is connected across the condenser 27 to the transformer winding 17, the receiver 11, and the transmitter 10 in series, and the low pass filter is connected across condenser 26 on the opposite side of the choke coils from condenser 27 to talking power lines 28 and 30 through one of the contact pairs of the hook switch (normally open). The talking power is supplied by direct current power source 31.

The local talking circuit made up of the transmitter, the receiver and the winding 17 of the transformer carries current which is prevented by the filter from entering the talking power lines 28 and 30 which are common to all of the sets. It will be understood that ordinary engineering practice and the amount of cross talk which can be tolerated in a given case will suffice to determine suitable values for the low-pass filter elements. In some cases condenser 26 may be omitted and in some cases choke coils 24 and 25 or the equivalent elements may be omitted. In this respect the present invention offers marked advantages over the prior art equipment, because the possibility of various cross connections which has existed in the prior art has made the problem of cross talk much more serious. The prior art has imposed very stringent requirements on filtering that do not exist in the present invention.

In addition to talking power lines 28 and 30, there are common ringing power lines 32 and 33 which are connected to a source of ringing power 34.

The various stations are connected with a suitable number of line pairs, line 1 having wires 35 and 36, line 2 having wires 37 and 38, line 3 having wires 40 and 41, and line N having wires 42 and 43.

Considering station A as a typical example, line 35 is connected to an intermediate contact of one of the contact clusters 12' of hook switch 12, which in normally closed position is connected to one side of relay 21, the opposite side of the relay being connected to the positive side of the ringing power source, to the movable contact of contact cluster 23' of privacy relay 23 which is normally closed and connected to busy signal (lamp) 44, which is connected to one of the normally open movable contacts of ringing switch 45, and the opposite side of relay 21 is also connected to one side of buzzer 22. The other side of the buzzer is connected through normally open relay contacts 21' to the negative ringing power line 33, and also to one side of normally closed unlocking switch 46 and also to the fixed contact of ringing switch 45 which in closed position connects with element 44. The other side of normally closed switch 46 in closed position connects with the other side of privacy relay 23.

When the hook switch is thrown to the opposite position, the mid-contact of contact cluster 12' connects with one side of transformer winding 18 and also with one side of condenser 20 which connects with normally open privacy relay contact 23$^3$ which in closed position connects at the opposite side with a normally open movable contact of switch 45 and with a normally closed mid-contact of contact cluster 13$^2$ of calling switch 13. Switch 45 when closed connects the opposite side of relay contact 23$^3$ when closed, with relay 23 and with resistor 47, the opposite side of the resistor connecting to the normally open contact of relay contact cluster 23'.

Line 36 connects with the side of transformer winding 18 remote from the connection to line 35 and also with one side of normally open privacy relay contact cluster 23$^2$, the opposite side of which connects with the movable normally closed contact of contact cluster 13' of switch 13, which in turn connects with the normally closed movable mid-contact of contact cluster 14', which in turn connects with the normally closed movable mid-contact of contact cluster 15' of switch 15. The normally open contact of contact cluster 13' connects with line 38 and the normally open contact of contact cluster 13$^2$ connects with line 37. The normally open contact of contact cluster 14' connects with line 41 and the normally open contact of contact cluster 14$^2$ connects with line 40, the normally open contact of contact cluster 15' connects with line 43 and the normally open contact of contact cluster 15$^2$ connects with line 42.

The relations of the line connections at the other stations to the line connections at station A just described are well known in the art.

In prior art station C, one ringing power line 32 is connected to one side of relay 21 and the one side of normally open relay contacts 21', the other side of which is connected to buzzer 22. The opposite side of relay 21 is connected with the normally closed fixed contact of contact cluster 12$^3$ of hook switch 12. Line 32 is also connected to the movable contact of contact cluster 23' of privacy relay 23, which in normal position is connected with normally open movable contact on switch 45, the opposite side of which when closed is connected to the side of contact cluster 21' adjoining the buzzer. The opposite ringing power line 33 is connected to the side of the buzzer remote from the contact cluster 21' and also to the side of unlocking switch 46 remote from privacy relay 23. The opposite side of switch 46 connects to relay 23. Wire 28 at the positive side of the talking power source is connected through choke coil 25 with a normally open contact of contact cluster 12$^3$ of hook switch 12, and this contact cluster when closed connects with one side of receiver 11, the other side of which is connected with one side of transmitter 10, the opposite side of which is connected to line 41, and to the movable contact of contact cluster 12$^4$ and is also connected to one side of normally open contact 23$^2$ of privacy relay 23, the opposite side of which when closed connects as in the new form with the movable contact of contact cluster 13$^2$.

The opposite talking power line 30 connects through choke 24 with a normally open contact of contact cluster 12$^4$ of hook switch 12.

Line 40 connects through condenser 20 with the normally closed fixed contact of contact cluster 12$^4$ of the hook switch, and also with one side of normally open relay contacts 23$^3$ of privacy relay 23, the opposite side of which connects with the normally closed contact of one of the contact clusters of switch 45, the other side of which normally connects with movable mid-contact of contact cluster 13' of calling switch 13. Line 40 also connects with movable normally closed contact of contact cluster 12$^3$ of hook switch 12. The other side 41 of line 3 connects with the side of transmitter 10 remote from the receiver, and with one side of normally open contact $23^2$, and also with movable contact of contact cluster $12^4$ of hook switch 12, normally in closed position.

Considering now the operation of the intercommunicating set disclosed in Figure 1, if we assume that set A originates a call to set B, the hand set of set A is lifted and switch A13 is manually operated. Ringing switch A45 is then momentarily operated, either manually or by mechanical connection in any suitable way to the operating mechanism of the calling switches, including switch 13, as is well known. A path for current from signalling power source 34 is then set up consisting of negative line 33, normally closed, switch A46, the coil of relay 23, ringing switch A45 (operated), contact cluster $13^2$ of switch A13 (operated), line 37, contact cluster B12′ of switch B12 (hand set in place), coil of relay B21, and positive line 32.

This action gives rise to operation of relay B21, thereby energizing signal B22 which operates. At the same time relay A23 operates and is held in operated position by making of holding contact cluster 23′ to complete the holding circuit from the source through resistor A47.

When the person answering lifts the hand set at set B, a circuit is set up for conversation between set A and set B, through winding A18 of transformer A16, condenser A20, make contact A$23^3$, make contact of cluster A$13^2$ of switch A13, line 37, make contact of contact cluster B12′ of hook switch B12, winding B18 of transformer B16, line 38, make contact of contact cluster A13′ of switch A13, make contact $23^2$ of privacy relay A23, and opposite end of winding A18 of transformer A16.

At each of sets A and B, the winding 17, the transmitter 10 and receiver 11 are traversed by direct current fed from talking supply lines 28 and 30 through choke coils 25 and 24 respectively. The modulation of this direct current by action of the transmitter 10 causes voice frequency currents to flow in a loop comprising transmitter 10, receiver 11, transformer winding 17 and condenser 27. This voice frequency current is transmitted by transformer action into the talking circuit between the sets including transformer winding 18 at each set.

It will be evident that while sets A and B are in conversation, a third set such as set C, for example, cannot obtain a connection with either of the others, as no path for signalling current required for operating of privacy relay C23 and completion of the talking circuit is possible owing to the disconnection of relay 21, at hook switch 12, in each case where the hand set is removed.

Under these circumstances the busy signal at calling station C operates by means of the make contact on ringing switch 45 and the break contact of contact cluster 23′ on privacy relay 23 which does not operate in this case. In set C the busy signal is the sounding of buzzer at set C. In the sets according to the preferred form, such as set A, the busy signal is obtained by means of positive line 32, the break contact of contact cluster A23′ of privacy relay 23, lamp signal A44, switch 45 make contact, and negative line 33.

Considering now the connection for conversation between sets A and B, when the hand set at set A is hung up, unlocking switch A46 opens as explained below, removing the locking current from privacy relay A23, which then falls back. In accordance with usual practice in the art, calling switches 13, 14 and 15 may be mechanically interlocked and also linked with the hook switch lever, so that operation of the hook switch lever or of a second switch arm will release an operated switch. Unlocking switch 46 is connected with this mechanism so that it opens when the hand set is hung up and also momentarily when one of the calling switches is operated. The privacy relay 23 thereby is disabled at the end of each conversation, whether this is denoted by replacement of the hand set on the hook or by the operation of a new calling switch with the hand set held off the cradle. Other means of accomplishing this same end as used in the prior art may be employed. For example, contacts on the calling switches may open to break the holding circuit of privacy relay 23, or it may be mechanically latched or unlatched, or some combination may be used. When the hand set at called set B is hung up no operation takes place other than restoring the set to idle condition to receive another call by return of hook switch B12 to the position shown in Figure 1.

To illustrate the circuit action further, when prior art set C is called by set B, the hand set at set B is lifted, switch B14 is operated, switch B45 is operated and a circuit for ringing is set up consisting of negative line 33, unlocking switch B46 closed, the coil of privacy relay B23, switch B45 closed, make contact of contact cluster B$14^2$ of calling switch B14, line 40, break contact of contact cluster C$12^3$ of hook switch C12, coil of relay C21, and positive line 32. Privacy relay B23 operates and holds, by means of resistor B47 and make contact B23′, and relay C21 operates as long as ringing switch B45 is held closed to sound signal C22.

When the hand set at set C is lifted, a talking circuit is set up through winding B18 of transformer B16, condenser B20, contact B$23^3$ closed. make contact of contact cluster B$14^2$, line 40, make contact of contact cluster C$12^3$ of hook switch C12, receiver C11 and transmitter C10, line 41, make contact of contact cluster B14′ of switch B14, contacts B$23^2$ closed, to the other end of winding B18 of transformer B16. At the same time it is noted that hook switch C12 applies positive talking potential via choke C25 to line 40 and negative talking potential via choke C24 to line 41. This gives rise to the serious weakness of the prior art sets mentioned above and avoided by the present invention, due to the fact that in the prior art sets an accidental short circuit between common supply lines, for example between lines 28 and 32, causes the privacy relay 23 to operate at calling stations regardless of whether the called set is busy or not, resulting in failure of the privacy feature of the system. This occurs because, although the signalling potential through relay coil 21 is removed from a busy set by opening of contact of hook switch 12, signalling potential still appears on the called home line, by virtue of the short circuit which is assumed to have occurred between lines 32 and 28, via the choke 25.

In the sets involved in the present invention, talking potential is never applied to the home line and calls made to a particular set find no potential at all on such line when the called set is busy. There is thus an important advantage in the present invention over the prior art.

It will be noted in Figure 1 that if the prior art set C be removed, there is no longer any need for separate signalling and talking power sources and these sources can be combined into a single power source. In this case all connections to line 32 from sets A and B are made instead to line 28, and similarly all connections made to line 33 are made instead to line 30. There is thus a considerable saving in cost of installation of the equipment.

It will further be evident from examination of Figure 1 that another advantage may be obtained. In set C condenser C20 is connected across the home line of that set, that is lines 40 and 41 when the hand set is hung up. This feature is required to avoid one of the unbalanced conditions that might lead to cross talk as above mentioned.

If this condenser were not so connected, it would be found that in a prior art system if set W were to call set X and set Y were to call set Z before either call is answered, calling sets W and Y can converse at a slightly attenuated level. This improper and unintended connection occurs by passage of speech currents through the coils of the relays 21 of the called sets, both of which terminate on common supply line 32, and the choke coils or equivalent means 24 of the calling sets, both of which terminate on line 30. A condenser 20 has been commonly connected as described to effectively suppress this unbalance and thus to substantially eliminate the undesirable effect.

Where the set is made according to the present invention, abnormal current paths of the character which have occurred in prior art sets cannot arise because there is no application of power from two power sources at the same time to circuits which are intended to be maintained separately. Accordingly the hook switch 12 employed in the present invention is much simpler than that required in the prior art and there is no need for a condenser across the home line when the hand set is hung up. Therefore it is possible to eliminate the condenser 20 in the manner now to be described.

Figure 2:
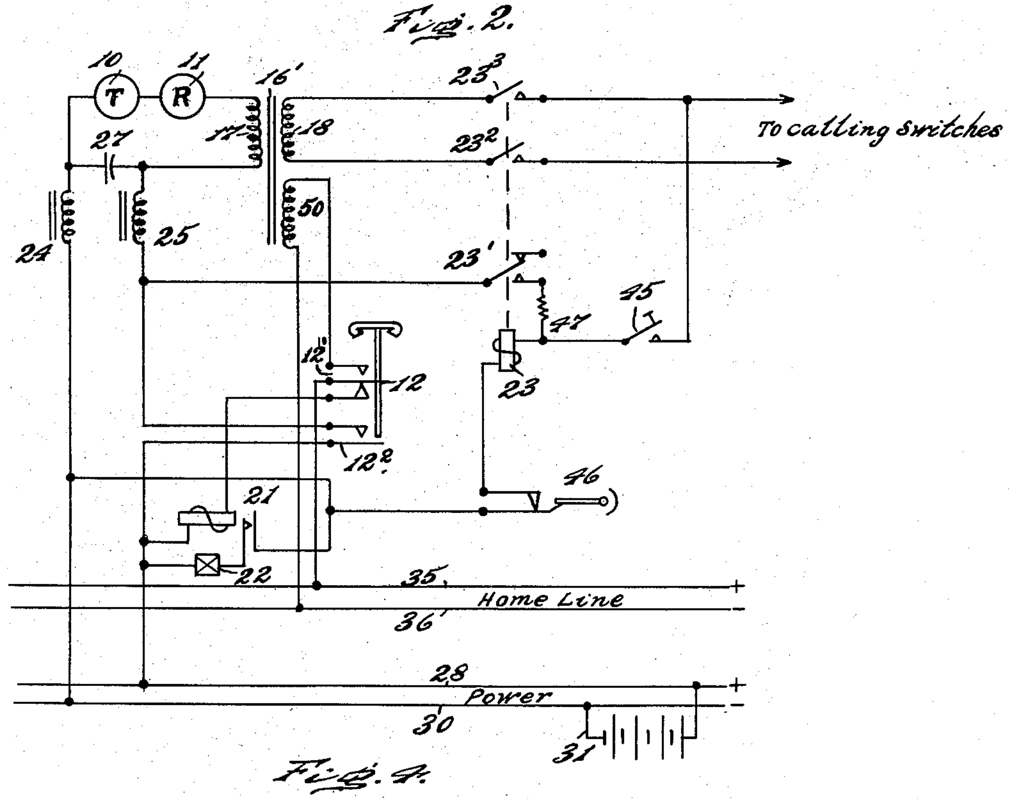

Figure 2 shows an alternate and preferred form of transformer which is so arranged as to eliminate the need for the blocking condenser 20. The circuit of Figure 2 shows only one set for simplicity but it will be understood that the additional connections between sets will be made as in Figure 1 and the operation of the set is in all respects similar to that of set A or set B in Figure 1 except that the home line of the set (the line on which calls are received by the set in question) is not connected directly to the winding of the transformer which is routed to the calling switches but instead is provided with its own winding 50.

Considering Figure 1, when the hand set is taken up, line wire 37 which is the positive home line of set B is connected through contact cluster 12′ on hook switch B12 to the upper terminal of winding B18 of transformer B16, while line wire 38, which is the negative home line of set B, is connected directly to the lower terminal of winding B18. It is therefore necessary to use in the equipment of Figure 1 a condenser 20 to block or open the path for direct current between the home line wire 37 and the calling switches. This is required because if we suppose set B calling set C is not busy but has not yet answered, privacy relay B23 has operated and locked up, closing a path from contacts $B23^3$ through switch B14, line wire 40 and relay coil C21 to positive signalling potential on line wire 32. As the hand set at set B is of course lifted, line wire 37, the home line of set B, would be directly connected to contact $B23^3$ if condenser B20 were shorted out.

If set A were to call set B, privacy relay A23, the busy test relay at set A, would not operate through relay B21, but it would operate through relay C21 over the circuit outlined above. Thus set A would be connected to set B improperly by virtue of this false operation of the calling busy test relay. This difficulty is avoided by insertion of condenser 20.

Figure 2 avoids the need for this condenser and thus saves cost and space. By leading the home line wires 35 and 36 to winding 50 of transformer 16′, all direct current paths between the home line and the calling circuits connected to winding 18 are eliminated. All other parts of the circuit of Figure 2 are similar to those in the circuit of Figure 1 and elements omitted may be incorporated as shown in Figure 1. The calling switches may be connected as illustrated in Figure 1 or in any other suitable manner. It is desirable but not essential that the calling switches connect the input disjunctively to the output connecting with the intercommunication multiple, by use of a transfer chain as shown in Figure 1 or by other suitable means, so that the operation of two keys simultaneously, if it were mechanically possible, would not short together two pairs of the multiple and thus interfere with their independent operation.

Figure 3:
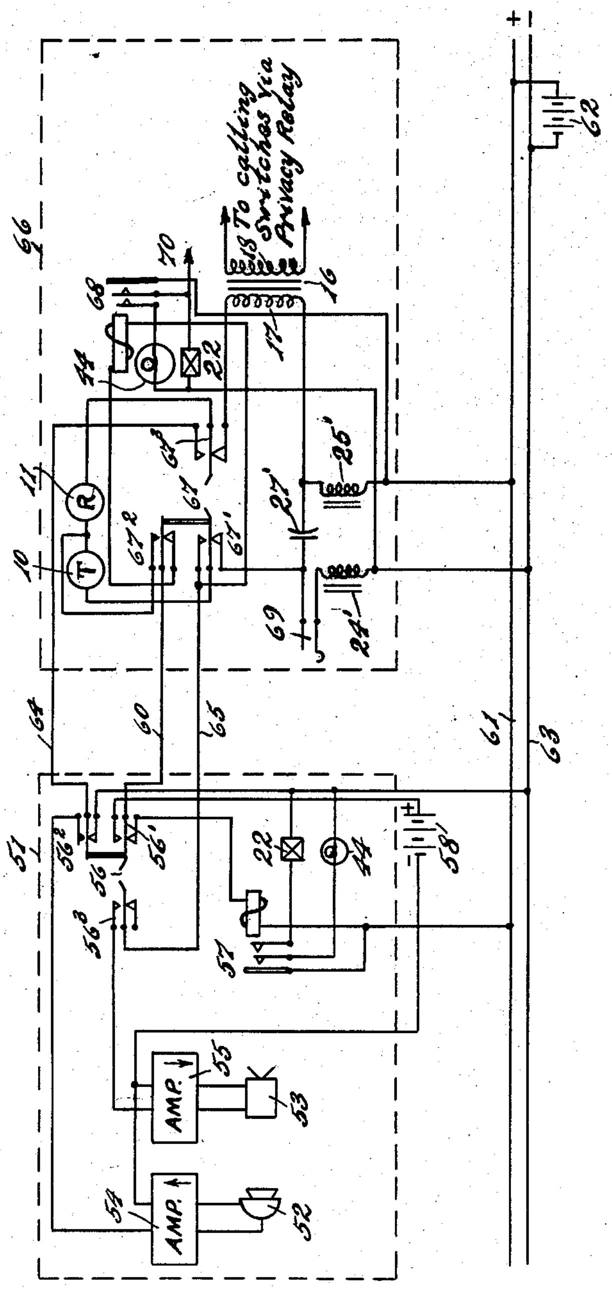

Figure 3 illustrates a switch for connecting to a loud speaking type telephone set of the character referred to as a master, executive or manager's set. The set 51 illustrates the bare essentials only and consists of a microphone 52, a loud speaker 53, an amplifier for the microphone, and an amplifier 55 for the loud speaker. A switch is provided at 56, a relay 57, a lamp signal 44 and an audible signal 22 with an operating battery 58. The battery at the positive side connects to a normally open contact of a contact cluster 56′ of switch 56 and when the switch contact cluster is shifted it connects to wire 60 to be described. In the normally closed position the contact cluster 56′ connects with the coil of relay 57, the opposite side of which is connected to positive power line 61 connected to battery 62. The movable contact of relay 57 is also connected to positive line 61. Negative power line 63 is connected to one side of lamp 44, the other side of which is connected to a normally open contact of relay 57 and to one side of audible signal 22, the other side of which is connected to a normally open contact of relay 57 and also to a normally closed contact of contact cluster $56^2$ of switch 56, which in the normal position connects with line 64. The normally open contact of this contact cluster connects with one side of amplifier 54, the other side of which connects with the other side of amplifier 55 and with the negative side of battery 58. Switch 56 also has a contact cluster $56^3$ which has a normally open contact connected to the side of amplifier 55 remote from battery 58 and has a movable contact connected to line 65.

Set 66 has a special switch 67 which, when it is operated, makes the circuit connections required for the three wire line connections to set 51. With the key of switch 67 in its non-operated position, transmitter 10 and receiver 11 are connected in the talking circuit comprising normally closed contacts of contact cluster $67^3$ of switch 67 and winding 17 of transformer 16 exactly as shown in Figure 1. When switch 67 is operated these connections are broken and transmitter 10 is connected directly to wire 65 through contact group 67′ and receiver 11 is connected directly to wire 64 and the mid-point between the two is connected directly to wire 60, the connections between the hand set elements and the local talking circuit including the transformer and power feeding elements being broken.

At the same time a signalling circuit to set 51 is set up from negative power line 63, to break contact of contact cluster $56^2$, wire 64, make contact of contact cluster $67^3$ of switch 67, receiver 11, make contact of contact cluster $67^2$ of switch 67, wire 60, break contact of contact cluster 56′ of switch 56, the coil of relay 57, and positive power wire 61. Relay 57 operates, sounding audible signal 22 and lighting lamp 44. When switch 56 is operated to reply, the signalling circuit just described is broken and relay 57 drops back, cutting off further operation of the audible and visible signals. By the operation of switch 56, wire 65 and hand set transmitter 10 are connected to the input of amplifier 55. The common amplifier terminal is connected through battery 58 to wire 60 and to the mid-point of the hand set in set 66. Receiver 11 is connected directly to the output of amplifier 54. Two-way conversation by means of loud speaker 53 and microphone 52 at set 51 and the hand set of set 66 can then be carried on. When the conversation is ended, both switches 56 and 67 are restored to their normal positions, returning both sets to the idle state.

To call set 66 from set 51, calling switch 56 is operated, setting up a signalling circuit through the positive terminal of battery 58, make contact of contact cluster 56′ of switch 56, wire 60, break contact of contact cluster $67^2$ of switch 67, coil of relay 68, wire 65, make contact of contact cluster $56^3$, input of amplifier 55 and negative terminal of battery 58. Upon the operation of relay 68, buzzer 22 sounds and visual lamp 44 lights as shown. When switch 67 is operated to reply, the circuit above mentioned is broken, relay 68 falls back and signals 22 and 44 are no longer energized. Two-way conversation is carried on as before described and it is terminated by the restoration of both switches 67 and 56 to their normal positions. Wire 70 in set 66 connects buzzer signal 22 to the portions of the circuit which have been omitted, for example (Figure 1) relay 21 and hook switch 12.

Positive power line 61 is connected to the side of transformer 17 remote from contact cluster 67' through choke coil 25', and line 61 is connected on the other side of choke coil 25' through condenser 27' to make contact of contact cluster 67' and to one side of normally open switch 69. The negative power line 63 is connected to the side of signal lamp 44 and of audible signal 22 remote from the contacts of relay 68, and also is connected through choke coil 24' to the other side of switch 69.

Figure 4:
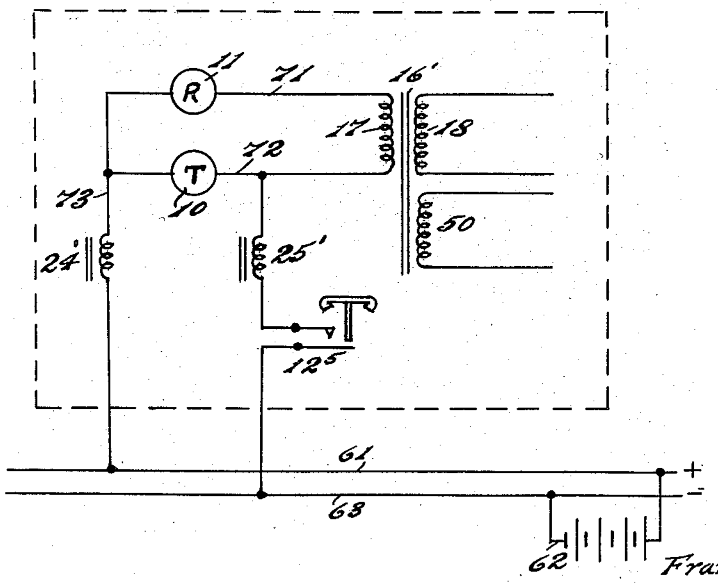

Figure 4 is a schematic diagram showing an alternate way of connecting the hand set telephone to the talking portion of the circuit in an intercommunicating set comprising a transformer in accordance with the invention. In this circuit the transmitter 10 is placed directly across the terminals of the two feeding choke coils (or equivalent elements) 24' and 25' which are connected to wires 61 and 63 from power source 62, replacing the condenser shown at this point in Figure 1. The condenser has been dispensed with entirely. The transmitter itself provides the necessary low impedance path across the ends of the choke coils 24' and 25'. The receiver 11 is placed across between the opposite end of transformer coil 17 and the transmitter, so that the receiver and the transmitter are in series with respect to the transformer winding but in parallel across the power source. Normally open hook switch cluster $12^5$ is in series between choke coil 25' and line 63.

This is the preferred circuit arrangement for the hand set elements in the local talking circuit and will preferably be used in the circuit of Figure 1 avoiding the usual condenser elements. It is to be noted that this accomplishes the desired result with only three conductors in the hand set cord. Figure 4 illustrates only those portions of the circuit necessary to illustrate the disposition of the hand set elements. If provision is to be made to call a loud speaking set as in Figure 3, the special switch contacts of that figure are inserted at points 71, 72 and 73. It is sometimes desirable to prevent the flow of direct current through the hand set receiver. This can be done without increasing the conductors in the hand set cord by inserting a condenser in the circuit of Figure 4 at the point 71.

Figure 5:
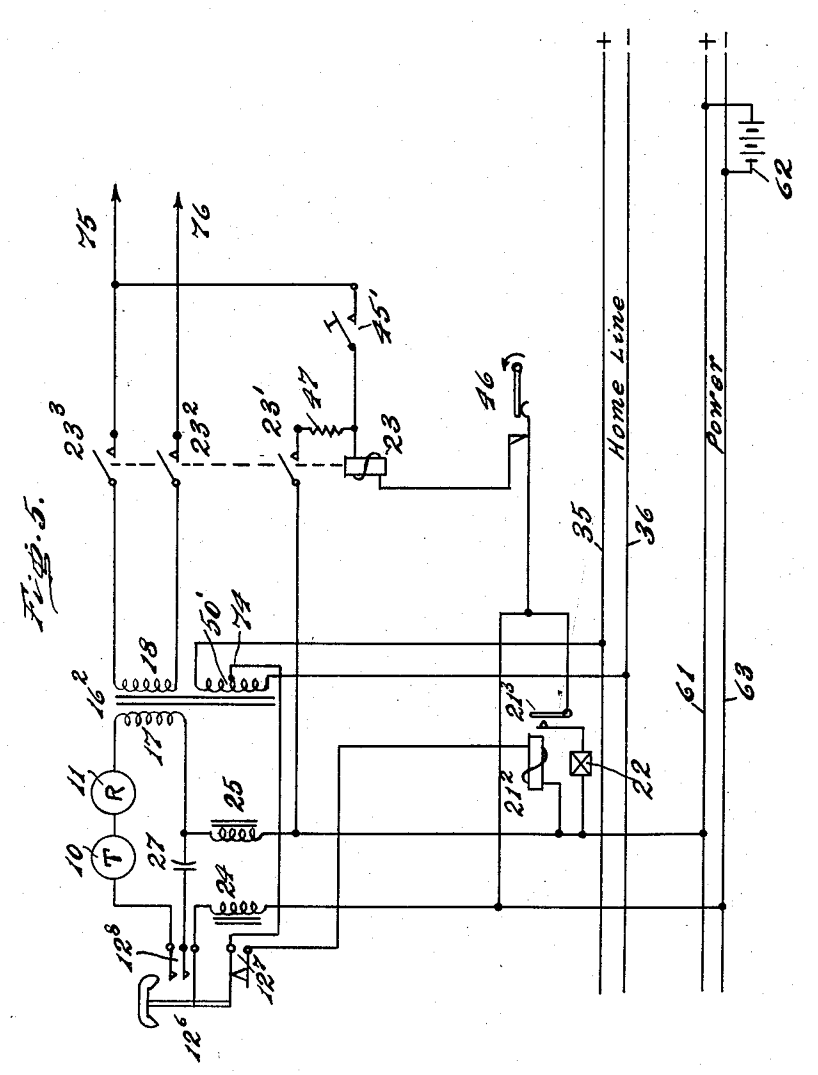

Figure 5 is a schematic circuit diagram illustrating an alternate method of connecting the call relay in the circuit and eliminating another undesirable feature of prior art equipment. It will be noted that the positive side of the calling lines (home lines) has in the above circuits ordinarily been used to carry the signalling current. Many of the installations are quite intricate and are commonly rearranged from time to time, so that the danger of inverting one or more home line pairs during installation, reconstruction or repair is considerable. Thus assume that pair No. 12 is being spliced at a point where two or more cables meet. The positive wire of the pair in the first cable may be accidentally connected to the negative wire of the No. 12 pair in the other cable and the negative wire of the No. 12 pair in the first cable connected to the positive wire of the No. 12 pair in the second cable. This causes the failure of the signal in the case of calls traversing that pair in that portion of the system. To correct the call it is necessary to trace the lines to find the particular terminal plug or splice where the error was made.

Figure 5 illustrates an improved circuit in which the danger of such a difficulty is avoided. In this case transformer $16^2$ has a third winding 50' for coupling to the home line in the manner described in reference to Figure 2. Instead of connecting relay $21^2$ to the positive home line when the hand set is hung up and manipulates hook switch $12^6$, it is connected to center tap 74 on transformer winding 50' and the entire winding 50' is permanently connected to the home line 35, 36. Thus a path is provided from either wire 35 or 36 of the home line pair to the signal relay $21^2$ through either half of the transformer winding 50'. As the direct current resistance of the transformer winding 50' is small, there is a substantially unhindered path from either side of the home line to the relay for signalling purposes. Accordingly it makes no difference which wire of the home pair the relay is connected to at the calling end in ringing and it is immaterial if the home pair wires are inverted at some point in the installation.

While the showing of Figure 5 is made with a three-winding transformer, it is immaterial whether the result is accomplished with three windings or two windings. Thus in Figure 5 it is immaterial whether winding 18 is omitted and contact cluster $23^2$ is connected to the lower end of winding 50' and contact cluster $23^3$ is connected to the upper end of winding 50' in series in each case with a condenser, or whether the form shown in Figure 5 is used. It will also be understood that where the resistance of the winding 50' is not exceedingly large with respect to the resistance of the coil of relay $21^2$, it is also immaterial whether the connection is made to the center tap of winding 50' or is made instead to either end of winding 50' or some point thereon so as to obtain the effect contemplated in the invention. In the form shown, the connections from positive power line 61 extend to relay coil $21^2$, the opposite side of which is connected to normally closed contact cluster $12^7$ of the hook switch and then to the middle tap 74 of transformer coil 50'. The positive side of the power source is also connected through buzzer 22 and normally open relay contacts $21^3$ to normally closed switch 46 which is also connected to the negative power line 63. Switch 46 is connected to privacy relay coil 23, the opposite side of which connects through normally open switch 45' to outgoing line 75 to the calling switch system. The opposite side of relay coil 23 also connects through resistor 47 and normally open contact cluster 23' of the privacy relay to the positive power line 61. The power lines in this form connect through choke coils 24 and 25 and contact cluster $12^8$ of the hook switch $12^6$ with the local talking circuit loop, the connections being similar to Figure 1. The opposite side of coil 18 is connected through contact cluster $23^2$ to line 76 to the calling switch group.

The principles of the invention may be applied where desired to reduce the number of relay contacts. The privacy relays are shown with a contact group in each of the two lines to the calling switches. It is immaterial in the present invention whether one of these is omitted. Thus in Figures 1 and 2 contact cluster $23^2$ may be omitted if desired and in Figure 5 contact cluster $23^2$ may likewise be omitted, running the wire straight through. In prior art sets it was necessary to use both contact clusters to prevent unbalanced line conditions when testing a busy line. This is no longer necessary where the transformer element is used in accordance with the present invention, as this prevents loss of balance even if only one side of the outgoing line is open at the privacy relay.

In view of my invention and disclosure variations and modifications to meet individual whim or particular need will doubtless become eivdent to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. An intercommunicating telephone equipment of the direct call secrecy type having a local talking circuit, a transmitter and receiver in the local talking circuit, a common system direct current power source providing talking power, a power line to the common system direct current power source providing talking power and connected to the talking circuit, an incoming line, signal receiving means connected with the incoming line, a outward sigalling and privacy circuit, a common system direct current power source providing signalling power, a power line to the common system direct current power source providing signalling power and connected to the signal receiving means and to the outward signalling and privacy circuit, a selecting switch arranged to selectively connect with incoming lines of other equipments, in combination with a transformer having a first winding connected to the local talking circuit and having a second winding connected with the incoming line, the outward signalling and privacy circuit and the selecting switch.

2. A telephone equipment according to claim 1, in which the transformer has a third winding to which the incoming line is connected.

3. A telephone equipment according to claim 1, in which there is only one power line to a single direct current source which energizes the equipment for both talking and signalling.

4. A telephone equipment according to claim 1, comprising a signal receiving relay at each station and a hand set hook switch at each station, wherein one winding of the transformer other than the first winding is permanently connected with the incoming line, the signal receiving relay is connected to some point on the one winding, and the hook switch breaks a circuit including the coil of the signal receiving relay when the hand set is lifted, whereby the need for maintaining polarity in the line pairs is eliminated.

5. A telephone equipment according to claim 4, wherein the point on the one winding is the center thereof.

6. A telephone equipment according to claim 1, in which the privacy circuit comprises a privacy relay with contacts interposed in the line between the selecting switch and the second winding of the transformer.

7. A telephone equipment according to claim 1, in which the privacy circuit comprises a privacy relay with contacts interposed in only one of the pair of wires between the selecting switch and the second winding of the transformer.

References Cited in the file of this patent

UNITED STATES PATENTS

| | | |
|---|---|---|
| 1,554,007 | Johnson | Sept. 15, 1925 |
| 2,190,155 | Jones | Feb. 13, 1940 |